United States Patent [19]

Mezzanotte

[11] Patent Number: 4,848,429

[45] Date of Patent: Jul. 18, 1989

[54] ASYMMETRICAL TIRE FOR VEHICLE WHEELS

[75] Inventor: Mario Mezzanotte, Milan, Italy

[73] Assignee: Pirelli Coordinamento Pneumatici S.p.A., Italy

[21] Appl. No.: 854,788

[22] Filed: Apr. 23, 1986

[30] Foreign Application Priority Data

Apr. 30, 1985 [IT] Italy .............................. 20547 A/85

[51] Int. Cl.$^4$ .......................... B60C 11/04; B60C 3/06
[52] U.S. Cl. .............................. 152/209 A; 152/209 R; 152/456
[58] Field of Search ............... 152/456, 209 R, 209 D, 152/209 A, 454

[56] References Cited

U.S. PATENT DOCUMENTS 3,286,756 11/1966 Ellenrieder et al. ............ 152/209 A
4,258,774 3/1981 Mirtain ............................ 152/209 R
4,271,889 6/1981 Pommier .

FOREIGN PATENT DOCUMENTS 359850 12/1980 Austria .
0071809 2/1983 European Pat. Off. .
2153774 5/1973 Fed. Rep. of Germany ... 152/209 R
2271062 12/1975 France .
1115546 5/1968 United Kingdom ................ 152/455
1588575 4/1981 United Kingdom .

Primary Examiner—Michael W. Ball
Assistant Examiner—Geoffrey L. Knable
Attorney, Agent, or Firm—Stevens, Davis, Miller & Mosher

[57] ABSTRACT

The present invention concerns a tire for vehicle wheels, intended for being used for sports events and for high performance, that is capable of guaranteeing, under any running conditions—of time, as well as of the road, the best road-behaviour characteristics.

The tire of the invention presents a tread pattern that is axially subdivided into two circumferential adjacent sections—of blocks and grooves respectively, and a tread-band—comprised by two circumferential portions that are axially adjacent—made from diverse elastomeric compositions and having a diverse thickness, where the line of separation—between the two sections of the pattern, does not coincide with the line of separation between the two portions made of elastomeric compositions.

The said tread-band, is supported by a mixed textile/metallic breaker structure, having an asymmetrical profile—with respect to the equatorial plane of the tire.

10 Claims, 4 Drawing Sheets

ASYMMETRICAL TIRE FOR VEHICLE WHEELS

DESCRIPTION

The present invention refers to tires for vehicle wheels, and more specifically, it concerns a tread structure (a combination of the elastomeric composition and the tread pattern) adopted for guaranteeing—especially in tires for motor-cars, the highest road-holding ability, under every sort of running conditions.

A good tread for tires, should collaborate with the tire structure for allowing the latter to satisfy diverse requirements with regard to safety, road-behaviour, and costs.

In particular, what is required, for example, of every good tire, is good road-holding quality, even at high speeds—whether in straightaway driving or in cornering, when accelerating or when braking; a strong direcrectional stability; an excellent fuel mileage and also a considerable degree of riding comfort.

As far as concerns the road-holding ability, in its complex whole this characteristic must be guaranteed under all conditions of the road surface—i.e. both on dry and wet roads, as well as on snow-covered or frozen ground.

However, in a single tread, these requirements prove to be in contrast and generally, incompatible with one another, so much so that the solution commonly followed is to create a relatively specialized tire for a prevelent working condition. Thus, on the market diverse types of tread patterns are available—amongst which there can be recalled, for example, those of a ribbed pattern, those with raised-blocks, the winter type, the all-seasons type, the on-and-off the road type, and so on.

In spite of this, the attention of those skilled in the art has been dedicated for some time past, to searching for a tread that was simultaneously and in the best possible way able to supply all these diverse requirements. Thus, diverse tires were proposed, that were essentially characterized by a tread pattern, divided circumferentially, into two axially adjacent and very diverse sections—for example: smooth, in one section, raised-blocks in the adacent section, and/or a tread-band comprised by two or more axially adjacent portions—with each portion being made of a specific elastomeric composition—which is divers to that of the portion adjacent it, and studied expressly for collaborating, in the best manner, with the type of pattern moulded upon it.

A tire of this sort—that proved to be quite satisfactory under every aspect, was already described by the same Applicant in his previous British Pat. No. 1,588,575.

The Applicant has now, quite surprisingly, discovered that this type of tire can be still improved further, by reciprocally combining together, in a new way, not just the diverse sections of the pattern and the diverse portions of elastomeric composition, but even in correlation with a modified geometry of the tire carcass structure, so much so that, the aim of the present invention is a tyre for vehicle wheels—specifically for motor-cars destined for high performances, above all in the sports events field, which maintains substantialy unaltered its considerable assets of road-behaviour under any whatsoever running conditions and in all kinds of weather.

Therefore, one object of the present invention is a tire for vehicle wheels, comprising a radial carcass—of a substantially toric profile, a tread-band placed in the crown zone of said tire, and a breaker-structure inserted in-between said tread-band and said carcass, the tread-band comprising two circumferentially adjoining, continguous portions made of diverse elastomeric compositions, and being provided with a pattern having raised-blocks in a first circumferential zone that corresponds to the first portion of elastomeric composition, and of a grooved type, in a second circumferential zone that corresponds to the second portion of elastomeric composition, characterized by the fact that the axial width of said first circumferential zone is less than that of said first portion and that said substantially toric profile is asymmetrical with respect to the equatorial plane of said tire—at least on said tread-band.

According to a prefered embodiment of this invention, the tire is characterized by the fact that the ratio between the axial width of said first zone and that of the said second zone is, at most 50/50, and that the ratio between the axial width of said first portion and that of said second portion is, at least 55/45.

The tire presents the above-said toric profile with having its maximum distance from the tire axis, in corresponence at least of a meridian plane that is distinct from the equatorial plane. Moreover, said first portion is conveniently made from an elastomeric composition having an elastic rebound of not less than 25%; while said second portion is made from an elastomeric composition having an elastic rebound of not over 20%.

Preferably, the ratio—between the maximum thicknesses, of said first portion and of said second portion, is not less that 55/45; in particular, the maximum thickness of said second portion is equal to the minimum thickness of said first portion.

Quite conveniently, the above-said toric profile corresponding to said tread, comprises three sections connected to one another—the two lateral sections being concave towards the inside of the tire, the central section being concave towards the outside of the tire.

In a particular form of embodiment of the invention, the section having the grooved-type of pattern, comrises two rectilineal circumferential grooves that define three continuous circumferential ribs, the central ribs being provided, on each wall, with a plurality of cavities apt for interrupting the continuity of the rib wall, with the axially outer rib presenting its axially inner wall having a plurality of cavities which are spaced apart circumferentially with that of the facing rib, with the surface, that slopes towards the tire sidewall, being provided with a plurality of transversal grooves as wide as said cavities, circumferentially distanced apart with the cavities disposed on the opposite wall.

In any case, the present invention will be better understood with the aid of the following description as well as of the attached figures—made solely by way of non-limiting example, wherein.

Figure 1:
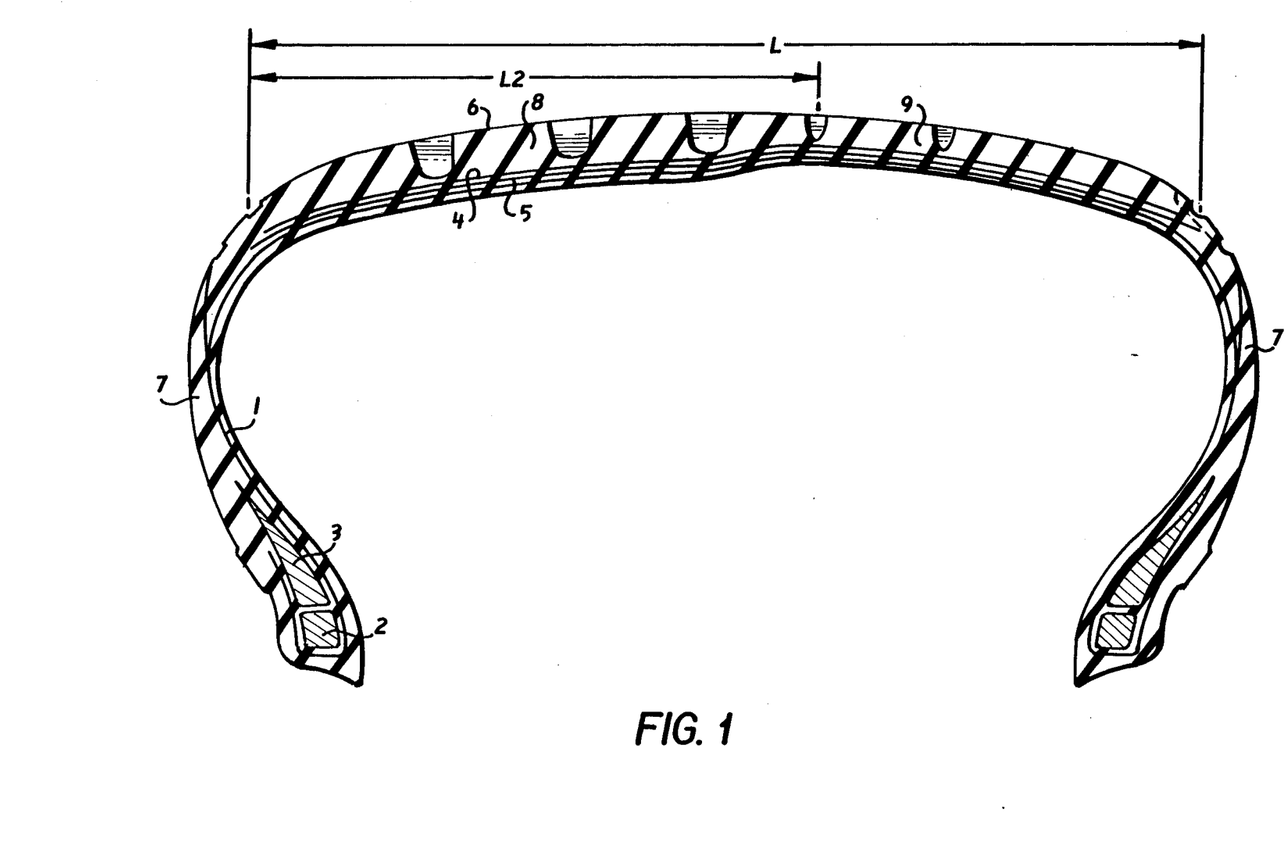
FIG. 1 shows the cross-section of a tire according to the invention, during the phase of moulding and of vulcanizing, in a first form of embodiment.

Therefore, FIG. 1 shows a cross-section of the tire of the invention—i.e. a section obtained with a radial plane passing through the tire axis.

Whereas the geometry of the carcass results as being substantially modified with respect to that of usual tires, the carcass structure does not vary substantially, from the actual commonly known structures. It comprises at least one reinforcing ply 1—having cords disposed radially, extending axially from bead-heel to bead-heel, and having its extremities, turned up around a bead-core 2 surmounted by a hard-rubber filler 3.

In the crown zone of the tire, in a radially outer position to that of the above-said carcass ply, there is disposed a breaker structure which is substantially inextensible both circumferentially as well as axially, comprising two rubberized-fabric strips 4 and 5—having their reinforcing cords disposed parallel to one another—in each strip, and crossed with the reinforcing cords of the adjacent strip; the said cords being disposed (during manufacturing the tire) preferably symmetrically inclined—with respect to the longitudinal direction of the tire itself.

Outside said breaker structure, there is disposed an elastomeric band 6 commonly known as a tread-band.

Since said tread-band extends axially, beyond the breaker's extremities and uniting with the elastomeric material, disposed on sidewalls 7 of the tire, herebelow the width of the tread-band and of the corresponding tread pattern, will be considered as being the maximum axial dimension L of the breaker-structure.

The thickness of this tread-band varies, from a minimum to a maximum, along its axial lay-out—and, in particular, it substantially presents all of the maximum values assembled on one side of the equatorial plane, and all of the minimum values assembled on the other side of the same plane.

Said distribution of the thicknesses, is present even in the formation of the tread-band, which is divided into two portions 8 and 9 each comprised by a specific elastomeric composition—that is different from that of the adjacent portion.

The axial width of the portion 8—which is the one that presents the maximum thickness, extends from one extremity of the breaker to beyond the equatorial plane—with thus reducing the axial width of the adjacent portion 9. According to the invention, the ratio L2/L—is never less than 0.55—with L2 being measured between the breaker extremity and the mid-point of the line of separation between the portions 8 and 9.

Preferably, the ratio between the maximum thicknesses of the two portions—respectively, the first and second, is never less than 55/45. For example, in a tire of size 225/50 VR16, the thicknesses of portions 8 and 9, are respectively 17 mm and 12 mm. Hence, with a value of said ratio being equal to 58.6/41.4.

As far as concerns the breaker structure, this can be made from fabric strips that are reinforced exclusively with metallic cords, or with a combination of metallic and textile cords. Vice-versa, the embodiment of a breaker-structure made exclusively out of textile cords, which is also possible, does not prove to be adequate for obtaining the level of service-life required today of this type of tire since, as is well known, textile cords do not resist compressional stresses, whereas the effects of such a state of stress, become important under certain running conditions—such as for example, when cornering.

Quite conveniently, in the tire of the invention, the breaker structure comprises a radially outer strip 4 with metallic cords, to which—in a radially inner position, there is coupled a strip of textile cords having a high ultimate tensile stress—in particular, aramid cords—for example those textile fibres known as KEVLAR—which is DU PONT's registered trade name for them.

This structure has a lesser transversal rigidity—with respect to the breaker that is made totally from metallic cords—and the importance of this expedience, will appear clear from the considerations given below.

The carcass of the tire of the invention is prepared in the conventional way, on a building drum, in a symmetrical form. In the readily outer position to the beaker-structure, there is assembled the already described dissymmetrical tread-band—of a thickness that is variable, from one extremity to the other. Next, the tire is moulded and vulcanized inside a traditional mould—this, in particular, also being symmetrical.

Owing to the effect of the moulding pressure that acts inside the carcass, and as a consequence of the diverse thickness of the tread-band along its axial width, the breaker tends to become disposed as in FIG. 1-i.e. according to a profile that presents three curvilinear tracts joined to one another—in such a way that the laterally disposed tracts present their concavity turned to face the inside of the tire, while the central tract instead, presents its concavity turned to face the outside.

Owing to the effect of this disposition of the breaker, the belt strips undergo a diverse degree of circumferential expansion—and hence, the reinforcing cords vary their laying-angle, with becoming disposed in the same strip according to the diverse angular values respectively in the two axial portions of the breaker, with reference to the tire's equatorial plane.

For example, with starting from a mixed textile/steel breaker structure, for a tire of size 225/50 VR16, realized as described—with cords (steel) disposed (during building the tire) at an angle of 25°, subsequent to the moulding phase, the said angle acquired values of 22° and 20° respectively, in the portions 8 and 9, of the finished tire.

The textile cords undergo a similar behaviour.

Therefore, the transversal rigidity of the breaker, conditions the profile according to which the breaker becomes disposed—during the moulding and vulcanizing phase, and determines what the tire profile will be during tire use.

In fact, if the breaker is very flexible, there will be no difficulty had at all, in disposing it according to the profile shown in FIG. 1—and in maintaining this configuration, during use, even in the vulcanized tire. But, as the rigidity of the breaker continues increasing gradually, it will have even more difficulty in forming the profile portion concave towards the outside of the tire, situated in a central position—so much so that this portion will always be less accentuated—until entirely disappearing, just as in the cross-sections shown in FIGS. 2 and 3—moreover, with forcing the tread-band to acquire its same profile, with thus rendering the variation of the thickness to be more gradual, along its axial development.

In this way, there a tread-band is formed (FIG. 2) presenting diverse thickness values—with gradually passing from the minimum value, to the maximum value.

Figure 2:
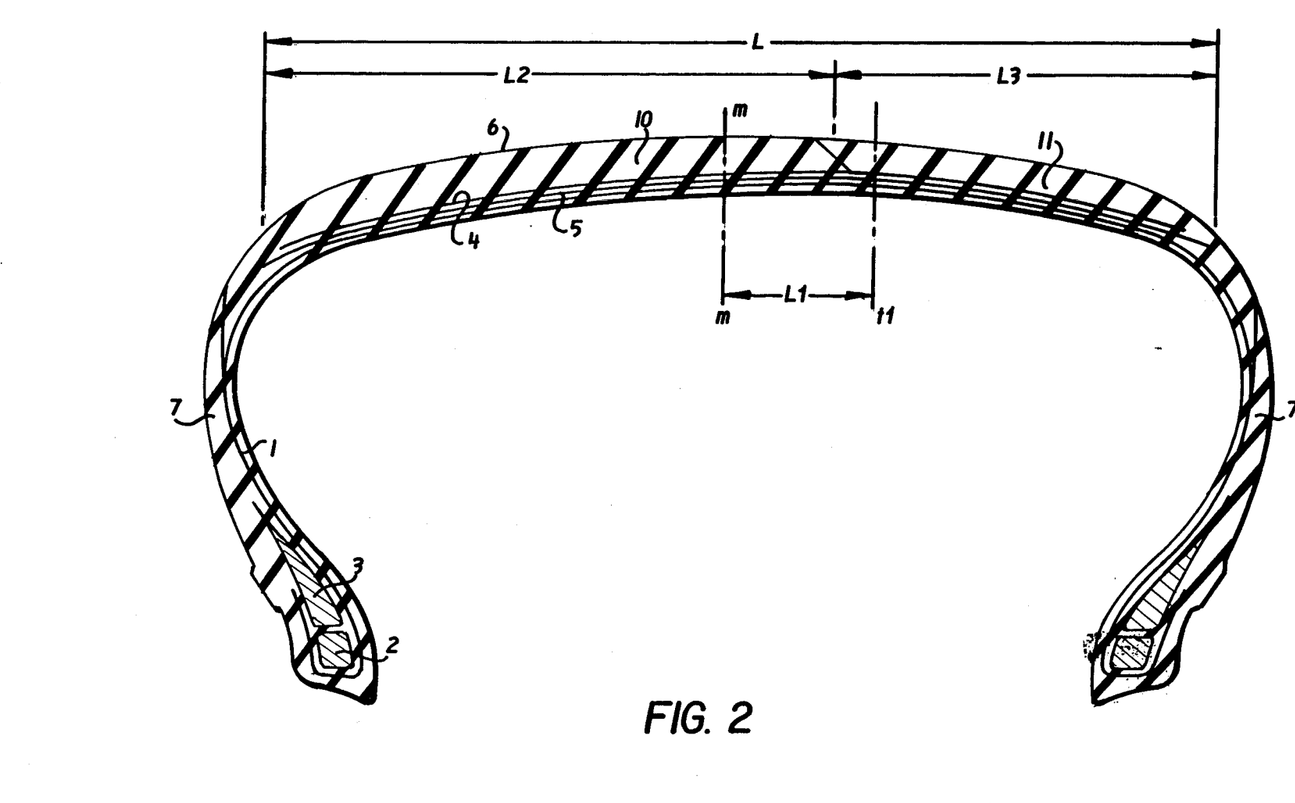
FIG. 2 shows a cross-section of the tire of the invention in a second form of embodiment, once again during the phase f moulding and of vulcanizing.

In fact, it can be noted in the form of FIG. 2, that said inner profile is comprised by a continuous curved line, whose maximum radial distance from the tire axis lies along a meridian plane t1 that does not coincide with the equatorial plane; the axial distance L1 between these two planes, that never exceeds 20% of the width L, is conveniently ranged between 12% and 16% of said length.

Figure 3:
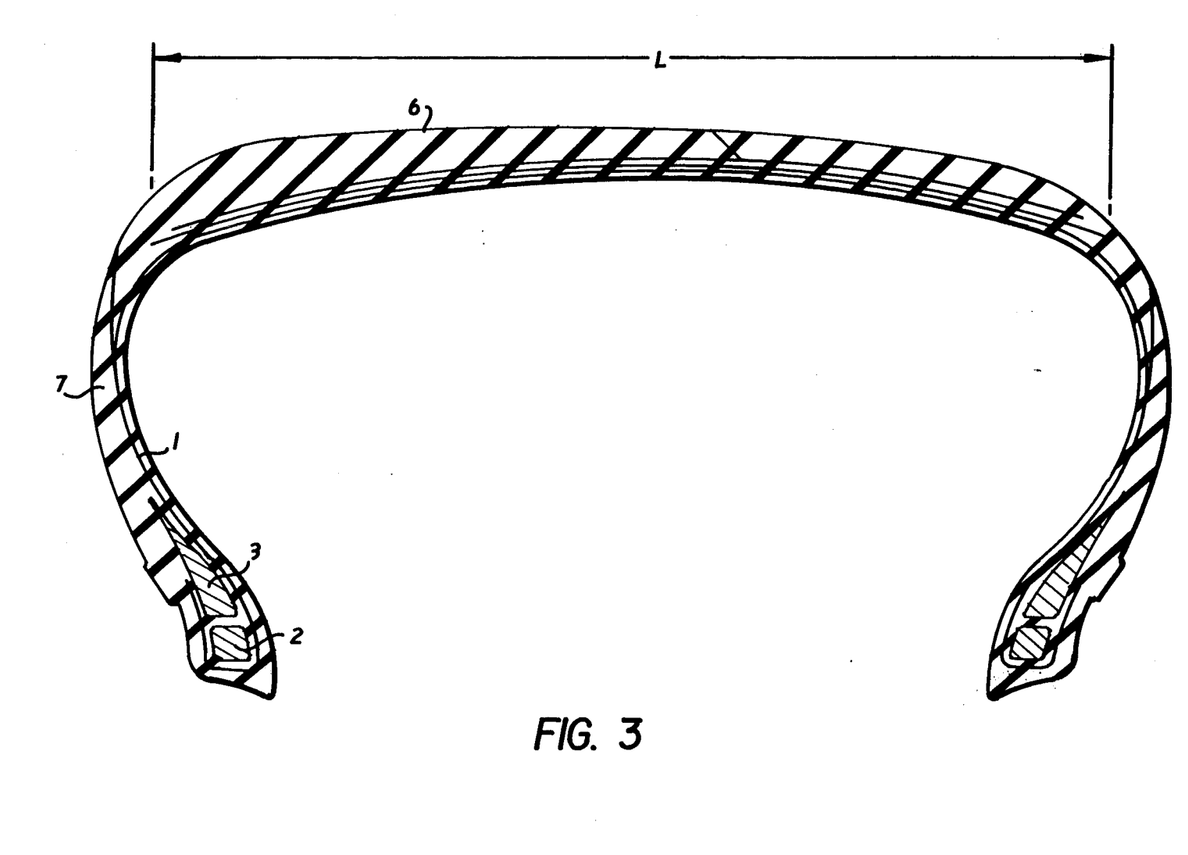
FIG. 3 shows a particular form of embodiment fior the tire of the invention, during use.

Finally—and still as a consequence of the transversal rigidity of the breaker, the tire mounted on the rim and inflated to use pressure, can maintain the perfectly symmetrical outer profile, that was conferred to it by the mould—just as shown in the case of FIGS. 1 and 2; however, it can also acquire an asymmetrical profile as with respect to the equatorial plane, as is shown in the case in FIG. 3—where the tire of the invention has an asymmetrical profile, even in the radially outer position. Naturally, this dissymmetry towards the outside of the tire—which is verified owing to the thrusts exercised by the breaker on the tread, under the effect of the tire's inflation pressure, renders the dissymmetry of the radially inner profile to be less accentuated.

Finally, it must also be specified that the breaker structure is not strictly limited to just the comprising elements described above, but that it can be integrated with added elements, according to any whatsoever known scheme. For example, in the tire of the invention, quite conveniently, the above-said breaker comprises a further fabric strip—in a radially outer position, reinforced with cords made of a heat-shrinkable material—nylon in particular, oriented parallelly or according to angles of a low value (not over 12°) with respect to the longitudinal direction of the tire.

Coming now to the tread pattern (shown in FIG. 4) with which the tire of the invention is provided, this pattern is divided into two circumferential adjacent sections—one presenting a raised-blocks type of pattern, and the other a groove or rib type of pattern.

The raised-blocks section—is made in the thickness of the portion 8 (FIG. 1) or else, portion 10 (FIG. 2), and it is destined fior guaranteeing the roadability and road-gripping, on snowed-over and frozen terrain. In accordance with this function, the elastomeric composition of the portion 8 is of the type that is capable of exercising excellent road-holding assets, under the above-said conditions and, in particular, it includes an elastic rebound of not less than 25%.

Figure 4:
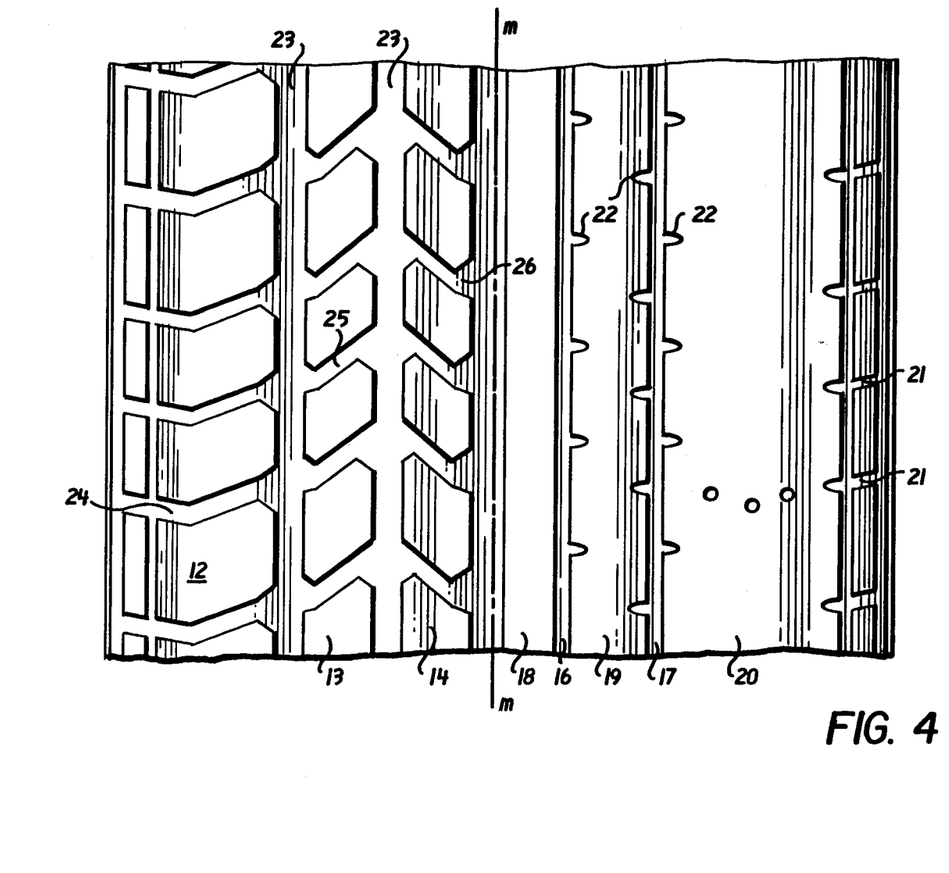
FIG. 4 shows the plane view of a circumferential portion of the tread pattern for the tire according to the invention.

The pattern features three, circumferential rows of raised-blocks 12, 13, 14, disposed on the same side of the equatorial plane m-m, and separated one from the other by two large circumferential grooves 23 and by a plurality of grooves 24, 25, 26, that are inclined transversally with respect to the above-said plane.

One important characteristic of the above-said pattern, is that the grooves that divide from one another the raised-blocks of the axially inner row, are inclined in the opposite sense with respect to the grooves that divide the raised-blocks of the two outer adjacent rows—at least in the zone of the ground-contact area. In other words, in row 12 of the raised-blocks—separated one from the other by the transversal grooves 24—constituted by two contiguous tracts that are inclined reciprocally in the opposite sense, the groove tract that is always present on the ground-contact area, is the axially innermost one; the axially outermost one is normally outside the ground-contact area of the tire—i.e. during straightaway running, with its only being occasionally able to touch the ground-contact area, in cornering.

It is found that this characteristic design of the transversal grooves, provides the tire with an excellent rendering in the milage covered and a regularity and uniformity in the wearing-out—even under extremely severe running conditions.

In an alternative embodiment for the above-said pattern, the row 12 of raised-blocks, could be subdivided into two adjacent rows of raised blocks, separated one from the other by a circumferential groove made in correspondence of the angle between the two tracts 24, of the transversal groove.

The grooved section is made (further on, a remark will be made in this respect) in the thickness of the portions 9 (FIG. 1), or 11 (FIG. 2), and it is intended for assuring an optimum tire behaviour under clear, dry or wet road conditions.

The corresponding pattern, comprises two circumferential grooves 16 and 17, which divide the corresponding mid-plane of the tire into three large circumferential ribs 18, 19, 20, and a plurality of short axial grooves 21, disposed on the axially outer edge of the rib 20.

The walls of the rib 19 and the axially inner wall of the rib 20, are again provided with cavities 22—as deep as that of the adjacent groove, distributed, with being circumferentially distanced-apart from one another, along the lay-out of the ribs. In particular, the grooves 21 are disposed in axial correspondence with the cavities—that are made on the axially outer wall of the rib 19. To be more precise, it is the axially inner extremity of the grooves 21 that is found in correspondence of the said cavities—since the grooves 21 can have any whatsoever inclination—less than 80°, with respect to the tire axis.

All these grooves and cavities, are considerably less deep than the grooves of the adjacent tread-section (about half, or a little more—but not over 70%) and rather narrow—in such a way as to confer to the corresponding tread section a massive aspect—with having a very high value for the solid/hollow ratio.

The value of the solid/hollow ratio for the entire tread, varies from between 0,5 and 0,8—while the said value, in just the grooved section of the pattern, varies, from between 5 and 8.

As a function of the grooved section, the elastomeric composition of the relative tread portion, is of the type having a high hysteretic loss, which is better suited for guaranteeing the assets of roadability and road-holding on dry and wet roads.

In particular, this type of elastomeric composition in the tire of the invention, is a composition which is characterized by an elastic rebound of not over 20%.

The Applicant has found that the value of the elastic rebound—is a critical parameter with respect to the road-performance of the compound in question.

As regards the rebound "per se", said characteristic of the elastomeric compositions is well-known to technicians of the field. For having a definition and evaluation of this, it is opportune and usual, to refer to the Norm ISO 4662.

Solely by way of non-limiting example, there shall now be given herebelow, an example of a recipe for the elastomeric compositions—apt for realizing the above-said portions A and B of the tread—i.e. respectively the portion having a greater thickness A (first portion) and the portion having a lesser thickness B (second portion).

| RECIPE (per 100 parts by weight of rubber) | COMPOSITION-A | COMPOSITION-B |
|---|---|---|
| Rubber SBR 1712 | —100 | — |
| Rubber SBR 1721 | — | —100 |
| Black ISAF | 65 | — |
| Black SAF | — | 80 |
| Aromatic Oil | 10 | 30 |
| Sulphur | 1 | 1 |
| Accelerators (Sulfa drug) | 2 | 2 |
| Zinc Oxide | 2 | 2 |
| Stearic Acid | 1 | 1 |
| Antioxidant (4010 NA) | 1.5 | 1.5 |
| Elastic Rebound percent | 30% | 17% |

Concerning the remark mentioned previously, this regards the fact that the grooved pattern extends beyond the compound-B portion—and that it is partially also made in the compound-A.

In other words, whereas the percentual ratio—between the axial dimensions of the two sections of the pattern, is conveniently 50/50—although it can even be upto 45/55 (45 for the raised-block section), the percentual ratio between the axial dimensions of the two tread-band portions, is never less than 55/45 (55—for the portion having a greater thickness), and conveniently, equal to 60/40.

The importance of this fact will result evident when considering that, in the known tires each section of the pattern was made in the corresponding portion of elastomeric composition, with consequent simultaneous variations in the axial dimensions of both the characteristics—i.e. both, the patter, as well as its elastomeric composition.

This involved the fact that—under every determined condition of the ground, the tire's road-holding assets were developed, almost exclusively, from the corresponding tread portion, with the other portion collaborating only to a minimum extent—so much so that, at a parity of the axial width of the two tread sections, under any whatsoever running conditions, only 50% of the tread was utilized.

Nevertheless, with the compounds adopted in the known tires, a width-for the raised-blocks section, that was equal to 50% of the tread, proved to be insufficient for guaranteeing a good road-behaviour of the tire upon snowed over and frozen terrain, for which reason the width of the raised-blocks portion, had to prevail over the grooved portion.

Unfortunately, for guaranteeing just as good a road-behaviour on dry roads, the grooved part—on having its width reduced, had to become more solid, with a consequent elimination of the grooves—till it eventually even became almost smooth.

Thus, this variation in the pattern, clearly involved a deterioration of the tire in the instance of the aquaplane phenomenon—and this negative consequence was partially remedied—by decreasing even further, the width of the smooth portion—till creating, on the corresponding portion of the tire's ground-contact area, a specific pressure having such a value as to break (di per se) the liquid film which forms during the rain, between the road and tread—and in this way to guarantee ground contact.

This restoration of the assets of tire behaviour, was thus compensated through a lesser rendering in the milage covered, or through a greater disposition for having a more rapid and irregular wearing-out of the tread.

The Applicant has now discovered that these defects could have been substantially eliminated—through having a particular combination in the choice of the elastomeric compositions for the tread patterns, through the axial dimensions of the diverse parts—and preferably, with also coupling a particular profile for the supporting structure underlying the tread. In this way, a tread is realized that is utilizable for running substantially upon 100% of its axial development in any whatsoever exercise conditions.

In particular, this result was obtained through a disassociating of the functions of the elastomeric material from that of the corresponding tread section—so much so that, in the tire of the invention, the raised-blocks section has an axial dimension that is always less than that of the corresponding elastomeric portion. In particular, while the width of said raised blocks section never exceeds 50% of the tread, the width of said portion of the tread-band is never less than 55% of the tread width.

In accordance with what is given above, in the pattern shown in FIG. 4, the rib 18 is formed out of precisely the same elastomeric composition as that of the raised-blocks section.

Moreover, the surface of the tread-band portion being quite ample, with having a low elastic rebound (width not less than 50% of the tread width), grooves can be made in it, that improve the tire's resistance to the aquaplane phenomenon.

The specific pressure—acting upon the ground-contact area, in correspondence of the grooved section, is now in the same order of magnitude—or even less (given the diverse solid/hollow ratio) than that acting upon the raised-blocks section, with a considerable improvement in the rendering of the milage covered, with respect to the known tires. Nevertheless, in relation to the characteristics of the compound adopted for the corresponding portion of tread-band, there still exists the possibility that, under particularly heavy duty conditions, the tire can result as being sensible to the phenomenon of an irregular and premature wearing-out on the ribs-above all along their edges—where a particular tendency towards lacerations exists.

Nevertheless, even this particular aspect of the problem, was solved by the Applicant—through the adoption of the cavities 22 (described above), that increase the flexibility at the edges of the ribs, under the ground-contact area, with thus guarding them against ruptures, lacerations and any premature wearing-out.

In conclusion the particular profile of the supporting structure of the tire, under the tread-band, minimizes the thickness of the elastomeric composition with high hysteretic loss—i.e. that thickness wherein the grooved pattern is impressed, and whose compound results as being most apt for guaranteeing a good tire behaviour on dry and wet roads. Hence, it sensibly reduces the heat developed by said portion of the tread during the running of the vehicle, and also favours the heat dispersion therein—with thus preventing any development of high temperatures—that prove to be extremely harmful not only for the resistance of the said compound, but also for the resistance of the tire structure, and consequently, for the service life of the tire itself.

Besides this, the above-said profile renders the road-behaviour of the tire to be extremely outstanding. In fact, the dissymmetry in the profile of the breaker structure—with respect to the tire's equatorial plane, has conferred to the tire a high sensibility to the steering action and a high promptness in steering response—with moreover, demonstrating excellent road-holding assets in cornering.

The Applicant holds that these surprising results, are owed to the fact that the above-said dissymmetry in the profile, gives rise in the tire to a system of forces acting upon the wheel-axis, that opposes—by compensating them, the forces originated owing the effect of the variations in the trajectory of the vehicle; with conferring to the tire a very high directional stability and a great capacity for re-aligning itself.

As far as concerns the mounting of the tire, of the invention, onto the vehicle, the mounting suggested as being that preferred—is that with the section having raised-blocks axially inwardly. As far as concerns the said raised-blocks section, this could also be moulded on the tire—by having its transversal grooves disposed as in specular-reflection with respect to the axial direction—i.e. with reference to FIG. 4, with the transversal grooves 24 and 25 sloping downwards, and with the grooves 26 sloping upwards.

Should both these types of tires—or more precisely their pattern, be disposable, the tire shown in FIG. 4, should preferably be mounted on the two motive wheels, with the tires—provided with a pattern in specular reflection, mounted on the driven wheels.

Herebelow, the results will be given of some tests—that were carried out with the scope of comparing the tire of the invention—with the assignee's best already-manufacturing tires, which were available on the market at the time of the invention.

TEST No. 1—ROAD-HOLDING ON WET ROADS TEST

The test consists in taking the running-time of a mixed circuit, on an artificially flooded course—covered at the highest speed possible. The car used for the test was a LANCIA (Delta Turbo with a four-wheel drive) fitted on its front-axis with a tire of size 205/55 VR16 and on its rear-axis with a tire of size 225/50 VR16.

| TEST RESULTS | |
|---|---|
| TIRE | RUNNING TIME |
| PIRELLI P7 | 59".97 |
| PIRELLI P77 | 57".94 |
| TIRE of the INVENTION | 56".25 |

TEST No. 2—TIRE ROAD-BEHAVIOUR TEST

The test consists in evaluating (subjectively and expressed in grades from 1 to 10)the determined behaviour characteristics of the tire and in taking (objectively) the running time of a given circuit—on a course covered at the maximum speed possible. The car used for the test was a PORCHE 928S, fitted with tires of size 225/50 VR16. The tires that were compared with it, are identified as follows:

| TEST RESULTS | | |
|---|---|---|
| Characteristics | A | B |
| Lateral stability | 7.0 | 7.5 |
| Handling/controllability | 6.0 | 7.5 |
| Steering-release in cornering | 6.0 | 8.0 |
| Tractive capacity | 6.5 | 7.5 |
| Aquaplane | 6.0 | 8.0 |

| -continued | | |
|---|---|---|
| TEST RESULTS | | |
| Characteristics | A | B |
| Running-time (average of 8 circuits) | 61".30 | 58".97 |

PIRELLI P7 - monocompound tread of a symmetrical structure and pattern A
TIRE of the INVENTION B To end with, the present description is intended as being given solely by way of non-limiting example—and hence, what must also be considered as comprised within the ambit of the invention are all those modifications and alternative variations that are not expressly described here, but which are easily deducible from the present inventive idea by one skilled in the art.

What is claimed is:

1. Tire for vehicle wheels having a radial ply carcass of substantially toric profile with a tread band of elastomeric material on the crown area of said tire, and a breaker structure between the tread band and the carcass;

said tread band having a radial thickness that varies from a maximum value to a minimum value along the axial width thereof;

said tread band consisting of first and second circumferentially contiguous portions made of dissimilar elastomeric compositions said first portion having an elastomeric rebound of not less than 25% and said second portion having an elastic rebound of not over 20% with the ratio between the axial width of said first portion of elastomeric composition and that of the second portion is at least 55/45;

said tread band consisting of first and second circumferentially contiguous zones having dissimilar tread patterns, the pattern of the first zone having raised blocks and generally corresponding to said first portion of elastomeric composition and the pattern of the second zone being a rib pattern with the ratio between the axial width of the first zone of tread pattern and that of said second zone is at most 50/50;

the axial width of said first zone being less than the axial width of said first portion such that the outer tread surface of the entire first zone and a part of the second zone is formed from the elastomeric composition of said first portion.

2. The tire of claim 1 in which the toric profile of the carcass has its maximum distance from the tire axis in a plane parallel to, but distinct from the mid-circumferential plane of the tire.

3. The tire of claim 1 in which the ratio between the maximum radial thickness of said first portion and that of said second portion is not less than 55/45.

4. The tire of claim 1 in which the maximum radial thickness of said second portion is equal to the minimum radial thickness of the first portion.

5. The tire of claim 1 in which the toric profile of said carcass along said breaker structure comprises a central and two lateral sections connected to one another, the two lateral sections being concave towards the tire interior and the central section being concave toward the outside of the tire.

6. The tire of claim 1 in which said rib type of pattern comprises two circumferential rectilinear grooves that define three continuous circumferential ribs, the central rib being provided on each of its walls with a plurality of cavities that interrupt the continuity of the wall, the axially outer rib having on its axially inner wall a plurality of cavities spaced apart circumferentially from those of the facing rib and the axial outer wall of said outer rib having a surface sloping towards the tire sidewall and provided with a plurality of transversal grooves as wide as said cavities, circumferentially spaced apart from the cavities which are disposed on said axially inner wall.

7. The tire of claim 1 in which the pattern of raised blocks comprises three circumferential rows created by three circumferential rectilineal grooves and by a plurality of transversal grooves, the transversal grooves of the axially inner row being oriented in the opposite sense with respect to the axial direction, to that of the grooves of the axially outer rows.

8. The tire of claim 1 in which said breaker structure comprises a first strip of rubberized fabric, reinforced with metallic cords and a second strip of rubberized fabric, in a radially inner position, reinforced with textile cords, said cords being parallel to one another in each strip, and crossed with the cords of the adjacent strip.

9. The tire of claim 8 in which said textile cords are aramid cords.

10. The tire of claim 8 in which the angle of inclination of said reinforcing cords is varying within a single breaker strip in accordance with its position in relation to said first and second portions of the tread band.

* * * * *